United States Patent [19]
Stokke et al.

[11] 3,793,543
[45] Feb. 19, 1974

[54] DYNAMOELECTRIC MACHINE

[75] Inventors: James A Stokke, Springfield, Mo.; Robert S. Langdon, Fort Wayne, Ind.

[73] Assignee: General Electric Company, Fort Wayne, Ind.

[22] Filed: Jan. 19, 1973

[21] Appl. No.: 324,954

[52] U.S. Cl. .................................. 310/90, 308/132
[51] Int. Cl. ....................... H02k 5/16, F16c 33/74
[58] Field of Search ...................... 308/132; 310/90

[56] References Cited
UNITED STATES PATENTS
3,250,579   5/1966   Tupper .............................. 308/132

*Primary Examiner*—Al Lawrence Smith
*Assistant Examiner*—Frank Susko

[57] ABSTRACT

Lubrication retention system includes oil throwing member. Features of improved oil thrower may be included in a thrust member. Particular benefits may be realized for vertical shaft motor applications which require frequent start-stop cycling and low speed operation. Oil throwers have oil feeding surfaces and departure surfaces or edges particularly oriented relative to one another and dimensioned to be within preselected ranges of sizes. Oil throwers can prevent oil from escaping down the motor shaft or past the lip of an oil well cover or end cap. Oil throwers are provided with departure surfaces (or slinging edges) specifically designed to have at least a minimum dimension so that oil droplets will not be thrown from a knife edge. Oil feeding surfaces are generally planar and lie in a plane normal to the axis of shaft rotation. The feeding surface and the slinging edge are oriented to define relatively square corners. Oil slinging edges are on a diameter sufficiently large to move at an angular velocity of a predetermined minimum speed. Clearances are provided between active oil thrower surfaces and adjacent surfaces.

8 Claims, 10 Drawing Figures

PATENTED FEB 19 1974

DYNAMOELECTRIC MACHINE

BACKGROUND OF THE INVENTION

This invention relates generally to dynamoelectric machines and, more particularly, to lubricant retention systems particularly adapted for use in electric motors that are primarily intended for use with the shaft thereof vertically disposed and in applications that require low speed operation and frequent start-stop cycling.

An important part of lubricant retention systems is the mechanism or member that is operable to transfer a quantity of lubricant (e.g., oil) to an oil reservoir after such quantity has moved across a motor bearing. These members are called by various names in the art (e.g., "slingers," "throwers," and "flingers") and may or may not be a part of a device that has additional functions.

For example, in Otto U.S. Pat. No. 3,573,510, a thrust bearing member is described as including a portion that acts as an "oil slinger"; and Shaffer U.S. Pat. No. 2,984,528 describes a thrust bearing member that may be used to provide an "oil slinging function." On the other hand, a lubricant "thrower" is referred to in Wightman U.S. Pat. No. 2,539,879; and an oil "flinger" portion is identified in Cunningham U.S. Pat. No. 3,235,317. Each of the just mentioned patents are assigned to the assignee of the present application and it will be understood that different terms, including "slinger," "flinger," and "thrower" may be used interchangeably to identify the same general type of lubricant transfer means.

In motors having sleeve or journal bearing lubrication systems, an oil thrower is usually provided adjacent at least one end of the bearing. In many cases, at least two oil throwers are provided, spaced axially apart along a shaft and each disposed at one end of the sleeve bearing. In order to simplify construction of such motors when it is desired to provide thrust bearing members, one or two of the oil throwers in a given motor may form a part of such bearing members.

While oil thrower arrangements known heretofore perform satisfactorily for motor applications where the motor shaft is horizontally disposed; it has been our observation that such arrangements are deficient for those applications where it is required that the motor shaft be vertically disposed and that the motor be operated intermittently (i.e., with frequent start-stop cycling) at low speeds — e.g., at speeds of from about 500 rpm to 600 rpm.

To verify our observation above referred to, we have tested numerous types of oil throwers by mounting them on a vertically disposed shaft and operating the shaft intermittently at 550 rpm. During these tests, the shaft was driven at 550 rpm for 1 minute and then stopped for 1 minute. Oil was fed to the top of the shaft continuously at a rate of approximately 1 gram per hour, the oil being fed during the "off" portion of each cycle to simulate the normal end flow of oil from a bearig that occurs during and just after stopping of a motor oriented in a vertical shaft configuration.

Following the test of each of these oil throwers, we calculated the ratio of grams of oil effectively thrown (from the given oil thrower) to grams of oil fed. We then multiplied this ratio by 100 and defined the product to be the percentage efficiency of the tested oil thrower. Alternatively, we collected the oil that was "not thrown" by the thrower and calculated the ratio of grams of oil that were lost to grams of oil fed. By "lost oil," is meant not "effectively thrown" oil that was not recovered in the oil collector. This oil was lost from the collector, e.g., by running down the shaft past the thrower under test; by being thrown outside of the oil collector, or by bridging from the thrower to the exterior of the oil collector. The ratio of oil lost to oil fed, when multiplied by 100, is herein defined to be the percentage of oil lost. As will be understood, the sum of the percentage efficiency and percentage of oil lost should equal 100 percent for any given tested oil thrower, assuming of course that all oil being fed or collected is recovered and measured with complete accuracy.

It is now apparent that for a given oil retention system relatively good oil thrower efficiencies may be observed for a horizontal shaft operation but very poor oil thrower efficiencies result with vertical shaft operation. This is particularly the case for intermittent, low speed, vertical shaft operating conditions.

Accordingly it is a primary object of the present invention to provide a new and improved lubricant retention system for motors.

It is another object of the present invention to provide such a system for vertical shaft low speed motor applications.

It is a more specific object of the present invention to provide an improved motor lubricant retention system having one or more parts with surface configurations or dimensions and relationships therebetween that result in markedly improved effective oil throwing characteristics during intermittent and low-speed vertical motor shaft operation.

It is still another object of the present invention to provide an improved lubricant thrower, the improved features of which may be incorporated with a thrust bearing member when desired.

SUMMARY OF THE INVENTION

In accordance with one form of the invention, we have provided an improved lubrication retention system, including at least one oil thrower, for a rotating machine such as an electric motor. Features of an improved oil thrower may be included in a thrust bearing member that is arranged to transmit rotor thrust to thrust receiving means in known fashion. Particular benefits resulting from use of the invention may be realized when oil throwers constructed as taught herein are utilized in electric motors intended for vertical shaft applications which require frequent start-stop cycling and low speed operation. Oil throwers embodying the invention have oil feeding surfaces and departure surfaces or edges that are particularly oriented relative to one another and are dimensioned to be within what we now believe to be a critical range. When so constructed, oil throwers can prevent oil that flows away from the bearing from escaping down the motor shaft or past the lip of an oil well cover or end cap, particularly under intermittent low speed vertical shaft operating conditions.

Systems embodying our invention include oil throwers that are provided with departure surfaces (or slinging edges) which are specifically designed to have at least a minimum dimension so that oil droplets will not be thrown from a knife edge. The feeding surface of such throwers are generally planar and lie in a plane normal to the axis of rotation of the shaft. The feeding surface and the slinging edge are oriented, one to another, so that they define relatively square corners. Moreover, the oil slinging edges are located on a diameter that is sufficiently large so that, during operation, the slinging surface will be moving at an angular velocity of a predetermined minimum speed. Clearances are provided between active oil thrower surfaces and adjacent stationary or rotating surfaces; all as will be understood more readily from the detailed description presented hereinafter which includes a specific description of two preferred embodiments of the invention that are shown in the accompanying drawings.

The subject matter which we regard as our invention is particularly pointed out and distinctly claimed in the concluding portion of this specification. The invention itself, however, both as to organization and method of operation, together with further objects and advantages thereof, may be best understood by reference to the following description taken in conjunction with the accompanying drawings.

DESCRIPTION OF THE PREFERRED EMBODIMENTS

Figure 1:
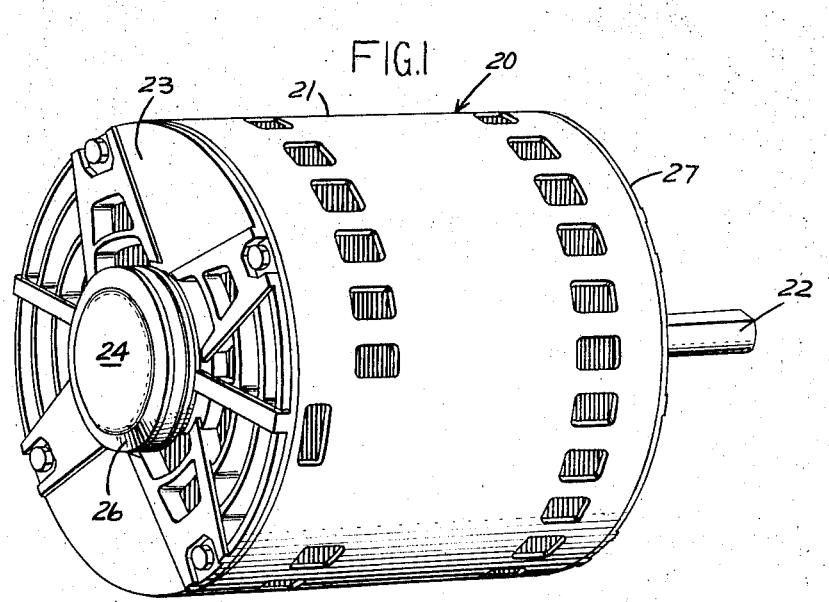
FIG. 1 is a pictoral view of a dynamoelectric machine illustrated as a motor and exemplifying the invention in one preferred form.

Referring now more particularly to FIG. 1 of the drawings, we have shown therein an electric motor generally identified by the reference numeral 20. The motor 20 includes a stator press fitted or otherwise secured within the shell or casing 21, and a rotor assembly that includes shaft 22. The motor 20 further comprises a pair of end frames or end shields 23, 27, each of which in turn support suitable bearing means for shaft 22. It will be understood, that while a two bearing motor 20 has been illustrated for purposes of description, the invention may of course be utilized in motors of the unit bearing type.

The end frame 23, visible in FIG. 1, is provided with an end cap 24 that closes the end of a lubricant retaining reservoir. Mounted upon a hub of the end frame 23 is a resilient mounting ring 26, specific details of which are known to those skilled in the art. A portion of the end frame 27 (hidden from view in FIG. 1) is better revealed in FIG. 2.

Figure 2:
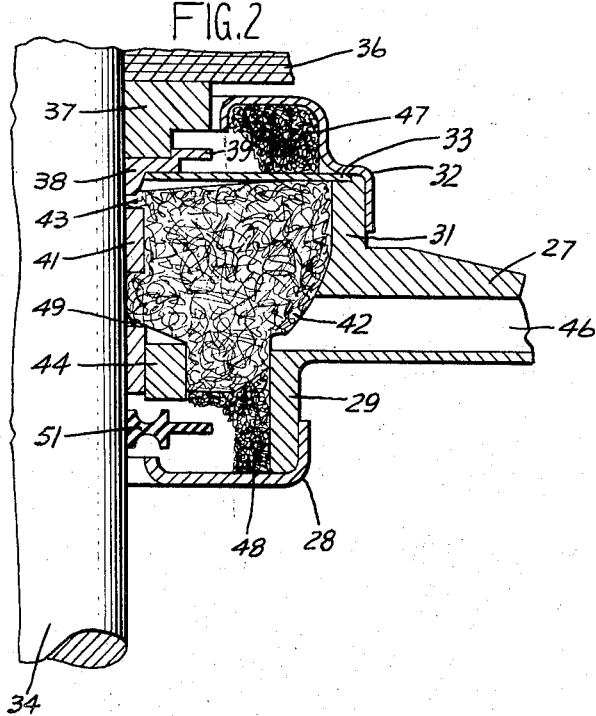
FIG. 2 is an enlarged view in elevation, with parts in section and parts broken away, of the motor in FIG. 1; it being noted that the motor is oriented for vertical shaft operation with the power output or pulley end of the motor facing downwardly.

In FIG. 2, parts have been removed and broken away for purposes of clarity. Thus, while parts of end cap 28 pressed upon the hub 29 of end frame 27 is shown; a resilient mounting ring that is mounted over the hub 29 has not been shown. The end frame 27 is provided with an inwardly directed hub 31 onto which an interior oil well cover 32 is pressed. In the assembly of this structure, the inner oil well cover 32 traps a triangular shaped thrust plate or thrust spring 33 against an end face of the hub 31 in a manner known in the art. Obviously, resiliently deformable thrust bearing members such as those shown in Cunningham U.S. Pat. No. 3,235,317 may also be used rather than triangular shaped plates, if desired.

FIG. 2 also reveals a portion of the shaft 34, and a portion of the laminated rotor core 36 that carries short circuited squirrel cage windings. The shaft 34, rotor windings, core 36, spacer collar 37, and thrust member 38 together form a rotor assembly. Any suitable material may be used to form the collar 37, and we have found it to be economical to machine the collar 37 from aluminum and then press fit the collar 37 upon the shaft 34. The thrust member 38 is press fit on the shaft so as to abut against the collar 37.

The thrust member 38 may be formed of any suitable material, and generally is selected to be a material that will have desirable antifriction characteristics and that will not be adversely affected by the lubricating oils used for fractional horsepower motors. One suitable material which is used extensively in the industry and which was used to form thrust member 38, is marketed as NYLATRON plastic by the Polymer Corporation. It will be noted that a portion 39 of the thrust member 38 is arranged to sling or throw oil. This will be described in more detail hereinafter in conjunction with FIG. 6.

FIG. 2 clearly reveals a sleeve bearing 41 of known construction that is pressed into an interior hub of the end frame 27. A lubricant applying member, shown as being made from a piece of felt 42, is provided with a tail or tip 43 so as to provide a film of oil to thrust bearing surfaces in the motor. A finger 40 of this wick projects into a window of bearing 41 and thus feeds oil to the surface of shaft 34. Aluminum ring 44 maintains a desired spacing of the felt wick 42 within the oil lubrication system shown in FIG. 2. The ring 44 is part of an internal end frame hub 59.

Oil may be supplied to replenish the oil within the reservoir of FIG. 2 by means of passage 46 formed in the end shield 27. This oil is wicked from the oil feeding passage 46 to the oil retaining masses shown at 47 and 48. These oil retaining masses may be conventional felt of the type commonly used in the lubrication systems of motors or it may be an extrudable lubricant type of material as shown. Examples of one commercially available type of extrudable lubricating material that has been used for materials 47 and 48 is described in detail in Ridgway U.S. Pat. No. 3,184,272.

During operation of motor 20, oil is wicked from the lubricant returning masses 47, 48 through feed wick 42 to surfaces of the shaft 34 adjacent to the window 49 in the bearing 41, and also to surfaces of the shaft 34 or other members that are contacted by the tail 43 of wick 42. The oil flows, during operation of the motor, along the surfaces of the thrust member 38 to the oil thrower portion 39 thereof, and then is slung or thrown into the lubricant returning mass 47. It will be understood that oil flows from the feed wick 42 through the window 49 and then in opposite axial directions along the shaft. The oil flowing downwardly along shaft 34 as viewed in FIG. 2 will be transferred to the oil thrower 51 and thrown tangentially outwardly therefrom into the lubricant returning and retaining mass 48.

Figure 3:
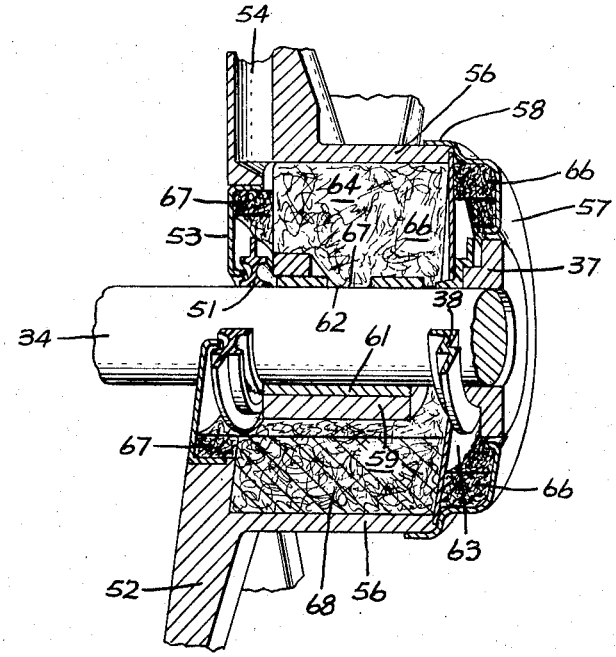
FIG. 3 is a view in perspective, with parts removed and parts broken away of a motor similar to the motor shown in FIG. 1 with the exception that the motor of FIG. 3 is provided with a flat end face rather than a hub ring mounting end face.

Specific dimensional relationships and orientation of surfaces of the thrower 51 will be presented in detail, along with a discussion of the oil throwing portion 39 of thrust member 38, in connection with the discussion of FIG. 6, and FIGS. 7–10, hereinafter. Turning now to FIG. 3 we have there shown parts of a motor having a flat face end shield 52. It will be noted that the end shield 52 is provided with a bore in the central portion thereof into which an end cap 53 may be press fitted. The end frame 52 also includes an oil passage 54 by means of which oil may be supplied to the oil retention system of FIG. 3. The reservoir of this system is bounded by the end frame hub 56, end cap 53, and an interior oil well cover 57. The cover 57 is provided with a flange 58 that is press fitted onto the end frame hub 56.

End frame 52 also includes an internal hub 59 which accommodates a bearing 61 having a window 62 therein. A thrust plate 63 (substantially identical to the thrust plate 33 in FIG. 2) is also provided, as is a felt feed wick 64 which includes a tail 66 and finger 67. The thrust and oil thrower members of FIG. 3 are identical in all respects to the thrust member and oil thrower of FIG. 2 and, accordingly, the same reference numerals (38, 51) have been used to denote these parts in FIG. 3. Similarly, the reference numeral 37 has been used to identify the collar in FIG. 3 which corresponds identically to the collar 37 in FIG. 2. However, it will be noted that felt storage wicks 66, 67, and 68 have been used in the embodiment illustrated in FIG. 3 rather than extrudable oil retaining masses.

Figure 4:
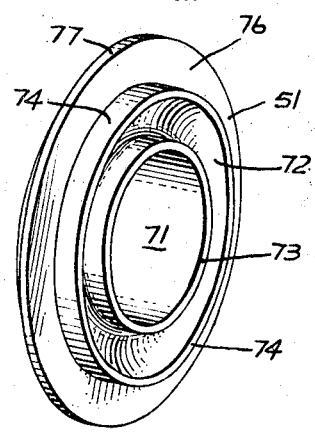
FIG. 4 is a view in perspective of an oil thrower shown in the lubrication retention system best illustrated in FIGS. 2 and 3.
Figure 5:
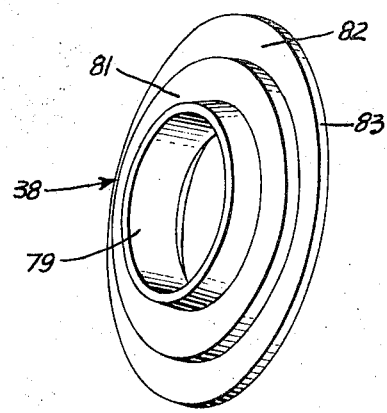
FIG. 5 is an enlarged perspective view of a thrust member that includes oil throwing portions, the thrust member also being shown in FIGS. 2 and 3.

Turning now to FIGS. 4 and 5, a more specific description of thrower 51 and thrust member 38 will be presented. It is preferred that thrower 51 be formed of a material that may be quickly and easily assembled in oil sealing relationship with the shaft 34 so as to prevent oil from creeping along the bore 71 of the thrower. In addition, the material for thrower 51 should be selected so that it will not deteriorate or swell in the presence of oil. Synthetic rubber materials with good resistance to oil deterioration from oil may be used to advantage in the fabrication of thrower 51. For example, an elastomer made by reacting butadiene with a nitrile may be used, and one such material is available commercially as Buna N rubber. Members 51 and 38 were molded.

It will be noted that the thrower 51 includes a sump 72 that is defined by flanges 73 and 74. It will be understood that the sump will tend to collect oil that flows down the shaft 34 after the motor has stopped. Sump 72 also represents a savings in material, since more thrower material would have to be used were a sump 72 not provided.

The oil feeding surface 76 is generally planar and will lie in a plane normal to the axis of rotation of the shaft 34 when the thrower 51 is assembled thereon. The departure surface or slinging edge 77 will then be concentric with the surface of the shaft 34. Also, the slinging edge 77 and feeding surface 76 intersect at relatively sharp corners as will be appreciated from the various views of the drawing.

Turning now to FIG. 5, the thrust member 38 includes a bore 79 which is sized so that the bearing thrust member 38 may be pressed onto the shaft 34 and an oil seal established to prevent oil creepage between the shaft and thrust member 38. The surface 81, as will be understood, cooperates with the thrust receiving plate or member 63 (better shown in FIG. 3). Also shown is a planar oil feeding surface 82 which lies in a plane normal to the axis of shaft 34 when the shaft and member 38 are assembled. The oil feeding surface intersects, at sharp corners, with the slinging edge or departure surface 83 of thrust member 38.

Figure 6:
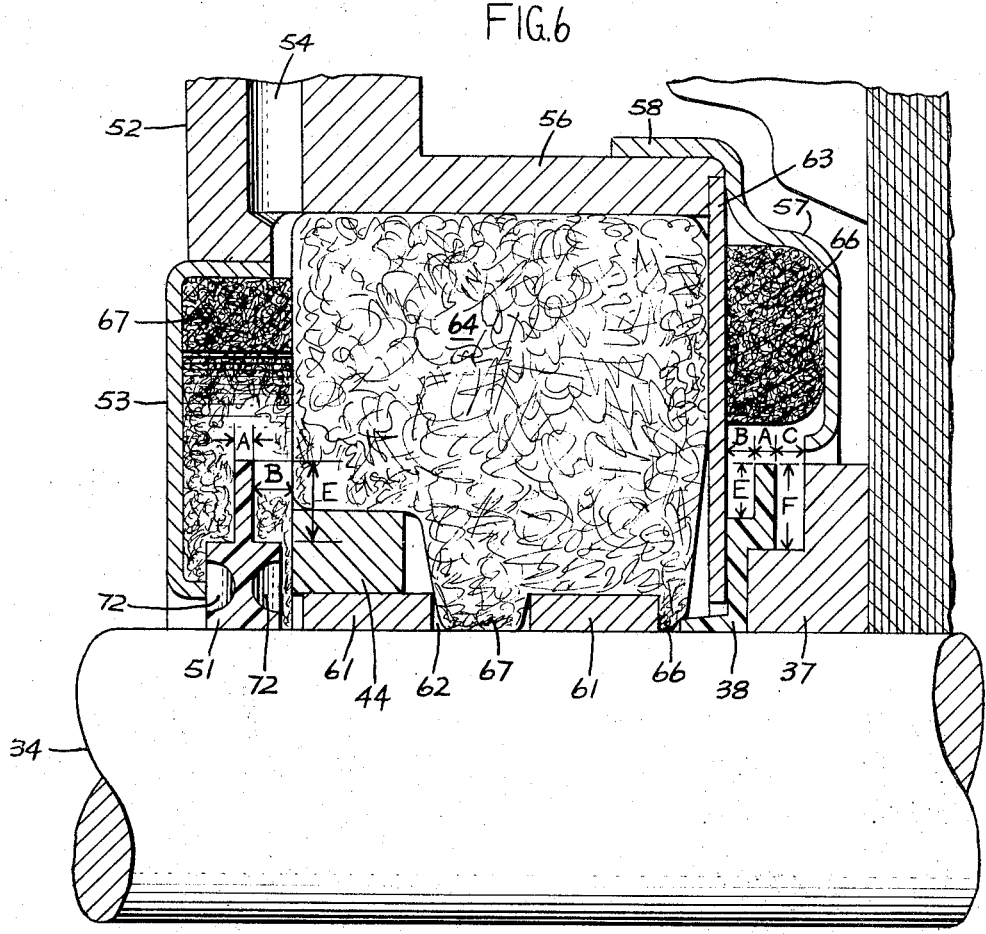
FIG. 6 is an enlarged elevation (with other parts removed and broken away) of the structure shown in FIG. 3, the motor shaft being horizontally oriented only to facilitate placement of FIG. 6 on the drawing sheet.

FIG. 6 is an enlarged view, with various parts removed and shown in section, of the structure shown in FIG. 3; and like reference numerals have been used for like parts in FIGS. 3 and 6. It will be noted from FIG. 6 that five dimensions indicated by the reference letters A, B, C, E, and F have been shown. We have found that by selecting values for these dimensions with care, we can design systems having oil thrower oil loss rates of only 0.058 percent and 0.12 percent, respectively, for the thrower 51 and thrust member 38, respectively; when operating a shaft in a vertical configuration at a speed of 550 rpm; and while using a conventional motor oil having a viscosity of 150 seconds. These low oil loss rates (the complement of efficiency) were obtained when the diameter of the throwing surface or edge was equal to or greater than a minimum value of 1.07 inches. With a diameter of a minimum of 1.07 inches (for 550 rpm operation), the peripheral velocity of the departure surface or slinging edges 77 and 83 was about 30 inches per second.

The dimension A was varied, and good results obtained, when the dimension A was from 0.03 inches to 0.06 inches. Better results also were observed when the dimension B was selected to be 0.05 inches minimum and the dimension C was selected to be 0.06 inches minimum. The radial extent of the feeding surfaces for the oil throwing members was selected so that the dimension E was a minimum of 0.11 inches and the dimension F was a minimum of 0.14 inches. In this connection, it should be noted that the dimension E is the radial dimension of the feeding surface of the throwing member. The dimension E is measured along the surface facing the axial direction from which oil would be flowing out of the bearing 61.

In summary, dimension A is the axial thickness of the throwing or slinging edge. Dimension B is the axial clearance between an oil feeding face and any adjacent stationary surface whether it be a thrust plate or other structure within the lubricant reservoir. Dimension C is the axial clearance (in the final assembly) between the surface along which dimension F is measured, and any adjacent surface whether rotating or stationary. Dimension E is the radial distance from the throwing edge to the nearest re-entrant angle on a thrower surface. The dimensions E and F thus are radial dimensions measured along thrower surfaces to points where oil may tend to bead or collect in vertical shaft applications.

Figure 7:
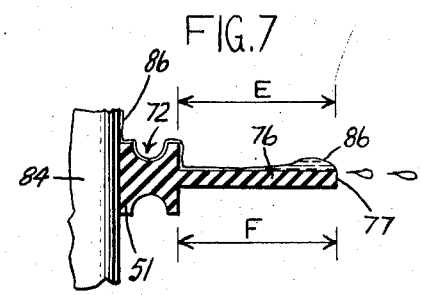
FIG. 7 is an enlarged elevation, with parts in section and parts removed, of the oil thrower of FIG. 4 mounted on a shaft.

Turning now to FIG. 7, the mechanism by which it is believed that the extremely satisfactory oil throwing results were obtained will be explained. In FIG. 7 (as in FIGS. 8 through 10) the shaft of the test apparatus will be represented by the reference numeral 84. The thrower 51 is illustrated and some of the dimension letters A, E, and F are also shown. In FIG. 7, oil 86 flows downwardly along the shaft, along sump 72, and outwardly along the oil feeding surface 76 to the oil throwing edge 77. Small droplets of oil then are effectively thrown tangentially. Oil along the outer peripheral surface 76 is thrown so efficiently and effectively, that when the shaft 84 is stopped, so little oil remains on the surface 76, that an oil bead is not formed that would bridge across the slinging edge 77. Thus, oil should not drip from edge 77 and become lost from the system. Moreover, oil that might continue to flow down the shaft 84 for a brief period of time will tend to be collected in the sump 72. Then, when rotation of the shaft 84 is again commenced, the oil will be cleared from the sump 72 and thrown outwardly by the slinger as illustrated in FIG. 7.

Figure 8:
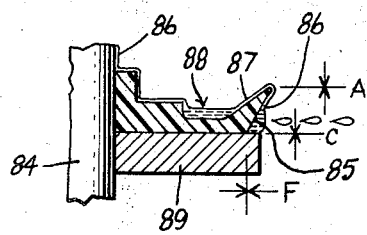
FIGS. 8 through 10 are somewhat schematic representations of parts of oil throwers mounted on vertically disposed shafts, illustration of these throwers being useful in explaining some of the principles of oil thrower operation.

For purposes of comparison, data relating to the structure of FIG. 8 will now be described. In the structure of FIG. 8, loss rates in the neighborhood of 70 to 80 percent were observed in most test set ups. Although all of the reasons for unsatisfactory operation of the FIG. 8 structure is not known with certainty, it is believed that the downwardly sloping edge 85 of the thrower 87 contributed to the unsatisfactory results. It was found that even when running at 550 rpm, the sump 88 tended to remain two thirds full of oil, and a speed of at least about 710 rpm was required to empty the sump. During vertical shaft operation, oil quickly filled the re-entrant angle established by thrower 87 and collar 89. Most oil slinging then occurred in this region. It will be observed that, in effect, the dimensions A, F, and C were equal to zero. The dimension F was zero because it is defined to be the radial distance from the effective throwing edge to the nearest re-entrant angle along the bottom thrower surface as seen in FIG. 8; that is, the radial distance from the slinging edge to the nearest angle less than 180° that holds an oil meniscus — i.e., nearest re-entrant angle. With a sloping surface such as that shown in FIG. 8, the dimension F is measured from the inner radius of such slope to the re-entrant angle.

Figure 9:
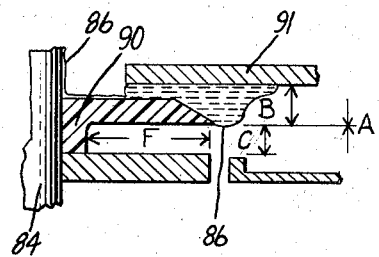

When tests were conducted with a thrower of the type shown at 90 in FIG. 9, the dimension A was effectively zero because a knife edge was utilized. Dimension E was 0.105 inches, dimension C was 0.06 inches, the effective throwing diameter of the knife edge was one inch; dimension B was varied between zero and 0.072 inches; and the dimension F was 0.19 inches. This arrangement was generally ineffective for throwing oil because excessive loss was observed, and bridging of oil occurred between the thrower 90 and a member 91 which represented a thrust plate. It was observed that oil tended to bead and build up, and remain in the sharp angle between the thrower member 90 and the plate 91. In fact, this bead was observed to actually bulge out beyond the outer diameter of the thrower and in these cases all slinging action would cease. Then oil would feed along the surface of the member 91.

It should be understood, that the illustrations shown in FIGS. 7 through 10 are herein presented for purposes of exemplification and description, are somewhat schematic in form, and that the actual dimensions of the parts herein being discussed are not necessarily shown to scale in FIGS. 7 through 10. However, it is believed that the oil thrower path and action in each of these FIGS. is generally correct. Moreover, all of the data or observations referred in connection with FIGS. 7–10 resulted from tests as described in the section hereinabove identified as "Background of the invention." Referring again to FIG. 9, it will be appreciated that since a knife edge was provided, the dimension A was equal to zero for all practical purposes.

Figure 10:
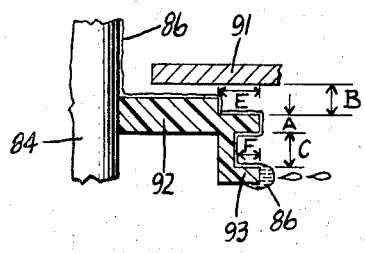

With reference now to FIG. 10, structures corresponding to the thrower 92 were tested but were generally unsatisfactory. Member 92 was dimensioned so that A was equal to 0.032 inches, B was equal to 0.057 inches, C was equal to 0.12 inches, E was 0.10 inches, and F was 0.065 inches. It was observed when testing this thrower 92, that oil appeared on the lower flange 93 shortly after starting. Tests then were stopped after a short period of time due to excessive oil loss. In the case of the structure 92, it is believed that the very small value of F (i.e., 0.065 inches as compared to what we believe should be a minimum of 0.14 inches) was the primary factor in causing excessive oil loss.

It should now be understood that values of the various critical dimensions we have described hereinabove may be varied depending upon factors such as surface tension of the oil being used, oil viscosity, wettability and roughness of oil thrower surfaces, etc. However, of all of the dimensions described above, it is believed that the dimensions B and C are those, the selection of which would be most influenced by the "drop" size of a given oil on a given surface of a given thrower.

While the invention has been explained by describing particular embodiments thereof, it should be apparent that changes may be made in the structure disclosed without departing from the scope of the invention. It is, therefore, intended in the following claims to cover all such equivalent variations that fall within the true scope of our invention.

What I claim as new and desire to secure Letters Patent of the United States is:

1. In an electric motor, a rotor assembly including a shaft rotatable about a longitudinal axis of rotation, means rotatably supporting said shaft, means for lubricating said shaft during rotation thereof, lubricant feeding means, and lubricant return means for returning lubricant to the lubricant feeding means; said lubricant return means including at least one lubricant thrower and at least one thrust member having a lubricant throwing portion; said lubricant thrower and said throwing portion each having a substantially planar lubricant feeding surface disposed in a plane substantially normal to the longitudinal axis of rotation and each having a lubricant throwing edge surface generally concentric with the shaft; said throwing edge surface of said throwing portion and thrower having a dimension along the direction of the axis of rotation of at least three-hundredths of an inch; and at least one of the feeding surfaces being spaced at least five-hundredths of an inch from motor structure next adjacent thereto.

2. The structure of claim 1 wherein the throwing edge surface of the thrower and throwing portion establish the radially outermost extremity of such parts;

each said edge surface having a diameter of at least one and seven-hundredths of an inch whereby efficient oil slinging will result during intermittent low speed vertical shaft motor operation.

3. An electric motor comprising a rotor assembly including a shaft rotatable about a longitudinal axis of rotation, means rotatably supporting said shaft, means for lubricating said shaft during rotation thereof, lubricant feeding means, and lubricant return means for returning lubricant to the lubricant feeding means; said lubricant return means including at least one lubricant throwing means; said lubricant throwing means having a substantially continuous lubricant feeding surface disposed in a plane substantially normal to the longitudinal axis of rotation and having a lubricant throwing edge surface generally concentric with the shaft; said throwing edge surface having a dimension along the direction of the axis of rotation of from about three-hundredths of an inch to about six-hundredths of an inch; said feeding surface being spaced at least five-hundredths of an inch from motor structure next adjacent thereto and terminating at the edge surface; said throwing means also including another continuous surface disposed in parallel relation to the lubricant feeding surface.

4. The structure of claim 3 wherein an annular cavity is provided on the feeding surface and on the another surface between the shaft and edge surface.

5. The structure of claim 4 wherein the edge surface has a diameter greater than one inch.

6. The structure of claim 3 wherein said lubricant return means includes a thrust member having a throwing portion; said throwing portion having an edge surface that is substantially concentric with said shaft.

7. The structure of claim 6 further including a collar on the shaft adjacent to the thrust member; said thrust member having spaced apart generally planar substantially parallel lubricant feeding surfaces that are oriented in substantially perpendicular relation to the axis of rotation.

8. The structure of claim 3 wherein the lubricant thrower is formed of an elastomer material.

* * * * *